(12) United States Patent
Towles et al.

(10) Patent No.: US 7,381,777 B1
(45) Date of Patent: Jun. 3, 2008

(54) METHOD FOR CONTROLLING FOULING IN SLURRY-TYPE POLYMERIZATION REACTORS

(75) Inventors: Thomas W. Towles, Baton Rouge, LA (US); James E. Skinner, Denham Springs, LA (US); Robert G. DePierri, Baton Rouge, LA (US); James Austin Kendrick, Baton Rouge, LA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 11/711,453

(22) Filed: Feb. 26, 2007

(51) Int. Cl.
*C08F 2/12* (2006.01)
*C08F 10/02* (2006.01)

(52) U.S. Cl. .................... 526/59; 526/61; 526/74; 526/84

(58) Field of Classification Search ............ 526/61, 526/74, 84, 59
See application file for complete search history.

(56) References Cited

U.S. PATENT DOCUMENTS

| | | |
|---|---|---|
| 3,177,184 A | 4/1965 | Cottle |
| 3,269,997 A | 8/1966 | Lyons et al. |
| 3,708,465 A | 1/1973 | Dietrich et al. |
| 4,211,863 A | 7/1980 | McDaniel et al. |
| 4,306,044 A | 12/1981 | Charsley |
| 4,326,048 A | 4/1982 | Stevens et al. |
| 4,547,555 A | 10/1985 | Cook et al. |
| 4,634,744 A | 1/1987 | Hwang et al. |
| 4,834,947 A | 5/1989 | Cook et al. |
| 5,237,025 A | 8/1993 | Benham et al. |
| 5,270,408 A | 12/1993 | Craddock, III et al. |
| 5,331,086 A | 7/1994 | Stricklen et al. |
| 5,399,320 A | 3/1995 | Craddock, III et al. |
| 5,543,479 A * | 8/1996 | Baade et al. ............... 526/88 |
| 6,262,191 B1 | 7/2001 | Hottovy et al. |
| 6,365,681 B1 | 4/2002 | Hartley et al. |
| 6,559,247 B2 | 5/2003 | Kufeld et al. |
| 6,825,292 B2 | 11/2004 | Reid |
| 6,838,531 B2 | 1/2005 | Reid et al. |
| 2004/0151642 A1 | 8/2004 | Burns et al. |
| 2004/0230031 A1 | 11/2004 | Hottovy et al. |
| 2004/0253151 A1 | 12/2004 | Nguyen et al. |

FOREIGN PATENT DOCUMENTS

| | | |
|---|---|---|
| EP | 1 272 536 | 5/2004 |
| WO | 2004/109417 | 12/2004 |

* cited by examiner

*Primary Examiner*—Fred M Teskin

(57) ABSTRACT

The present invention relates to methods for controlling fouling in the reaction zone of slurry-type olefin polymerization reactors by measuring a process operating parameter and by responding to said process operating parameter, e.g., by introducing a gaseous poison for the polymerization catalyst in response to a comparison between said measured parameter and a fouling parameter limit for said measured parameter.

23 Claims, 2 Drawing Sheets

METHOD FOR CONTROLLING FOULING IN SLURRY-TYPE POLYMERIZATION REACTORS

FIELD OF THE INVENTION

The present invention relates to methods for controlling fouling in the reaction zone of slurry-type olefin polymerization reactors by measuring a process operating parameter and introducing a gaseous poison for the polymerization catalyst in response to a comparison between that measured parameter and a fouling parameter limit for that parameter.

BACKGROUND OF THE INVENTION

"Kill" systems and catalyst deactivating agents for gas phase polyethylene reactors and for olefin polymerization catalyst systems are known in the art. Prior art thought to be of significance to the claimed invention is discussed below.

U.S. Pat. No. 3,177,184 discloses a method for controlling the polymer production rate of copolymers of ethylene with higher olefins. This patent describes polymerization of ethylene-co-1-butene copolymers using hexavalent chromium oxide catalyst where the ethylene/1-butene content, and thus the copolymer density, can be controlled by controlling the activity level of the catalyst with a deactivator.

U.S. Patent Application Publication Nos. 2004/0230031 A1 and 2004/0151642 A1 both generally disclose methods for deactivating catalysts in polymer streams, e.g., for the purpose of allowing downstream equipment to be repaired or process control problems to be corrected.

U.S. Pat. No. 6,825,292 and European Patent No. EP 1 272 536 both disclose situations in which transitioning between two different types of polyolefin catalysts, particularly when one of those types of catalyst is a "late transition metal" (LTM) catalyst, can cause deactivation of the other type of catalyst.

U.S. Patent Application Publication No. 2004/0253151 A1 and International Publication No. WO 04/109417 both disclose methods for stopping runaway chemical reactions in a reactor by introducing a kill agent into the reactor through actuation of a pressure-sensitive valve, not via measurement of pressure in the reactor and introduction of the kill agent in response to the comparison of the measured pressure to any set pressure.

U.S. Pat. No. 6,365,681 discloses methods for preventing upsets in polymerization reactors by monitoring at least one reaction condition and comparing it to the desired value or normal range for the condition, as projected by a computer model for the variable(s) in the process.

U.S. Pat. Nos. 6,838,531, 6,559,247, 6,262,191, 4,211,863, and 3,269,997 all disclose methods for introduction of catalyst deactivating agents in post-polymerization steps/apparatuses, but not in the polymerization reactor nor in any reaction zone therein, for various reasons, e.g., polymer recovery, catalyst removal, decolorization, and the like.

U.S. Pat. Nos. 5,331,086, 4,634,744, and 3,708,465 each disclose different types of catalyst deactivators, e.g., ketones, metal salts, alcohols, ethers, and the like, and their use in interrupting and/or de-ashing olefin polymerizations.

U.S. Pat. Nos. 5,339,320, 5,270,408, 4,834,947, 4,547,555, 4,326,048, and 4,306,044 all disclose methods for stopping gas phase polymerizations, some under emergency shutdown situations, by introducing a "kill" gas.

The prior art even contains disclosure, i.e., in U.S. Pat. No. 5,237,025, where carbon monoxide is introduced as a reducing gas for a low pore volume silica-supported chromium catalyst as an activating agent, not as a deactivating agent.

Nevertheless, there remains a need, not addressed by the prior art, for ways to control fouling in the reaction zones of slurry-type ethylene-based polymerization reactors using gaseous catalyst poisons to significantly slow or to stop the polymerization to reduce, inhibit, and/or prevent fouling.

SUMMARY OF THE INVENTION

One aspect of the present invention relates to a method for operating a slurry-type polymerization reactor comprising the steps of: (a) polymerizing a monomer feed, which comprises a majority of ethylene and optionally a comonomer, in a reaction zone of the slurry-type polymerization reactor in the presence of a slurry diluent and a slurry catalyst (e.g., comprising a metal selected from Groups 4-6 and 8-10 of the Periodic Table of Elements) to form an ethylene-based polymer; (b) measuring a process operating parameter relating to the reaction zone of the polymerization reactor; and (c) when the process operating parameter rises above or drops below a fouling parameter limit, introducing a gaseous poison for the slurry catalyst into the reaction zone of the polymerization reactor to reduce, inhibit, and/or prevent fouling therein.

Another aspect of the invention relates to a method for responding to changing conditions in a slurry-type polymerization reactor comprising the steps of: (a) using a reactor circulating pump having a desired power draw range, circulating a monomer feed, which comprises a majority of ethylene and optionally a comonomer, in a reaction zone of the slurry-type polymerization reactor in the presence of a slurry diluent and a slurry catalyst (e.g., comprising a metal selected from Groups 4-6 and 8-10 of the Periodic Table of Elements); (b) polymerizing the monomer feed to form an ethylene-based polymer, wherein the reaction zone of the polymerization reactor has a reaction temperature range and a fouling temperature that is greater than the reaction temperature range; (c) measuring a temperature in the reaction zone for comparison to the reaction temperature range and the fouling temperature; and (d) responding to changing conditions in the polymerization reactor as follows: (i) when the measured temperature in the reaction zone exceeds the reaction temperature range but does not exceed the fouling temperature, reducing or substantially halting the monomer feed into the reaction zone, optionally proximate to the measured temperature, (ii) when the measured temperature in the reaction zone exceeds the fouling temperature, introducing a gaseous poison for the slurry catalyst into the reaction zone, optionally proximate to the measured temperature, to reduce, inhibit, and/or prevent fouling therein, and (iii) when the reactor circulator pump rises above or drops below the desired power draw range, introducing a gaseous poison for the slurry catalyst into the reaction zone, optionally proximate to the measured temperature, to reduce, inhibit, and/or prevent fouling therein, and optionally but preferably reducing or substantially halting the monomer feed into the polymerization reactor.

Further, as described herein, it is contemplated that embodiments listed separately, even in different aspects of the invention described herein, may be combined together with one or more other embodiments, provided that the embodiments do not have features that are mutually exclusive.

BRIEF DESCRIPTION OF THE DRAWINGS

This invention can be better understood by reference to the detailed description of the invention when supplemented with the attached drawings, wherein.

DETAILED DESCRIPTION OF THE INVENTION

Figure 1:
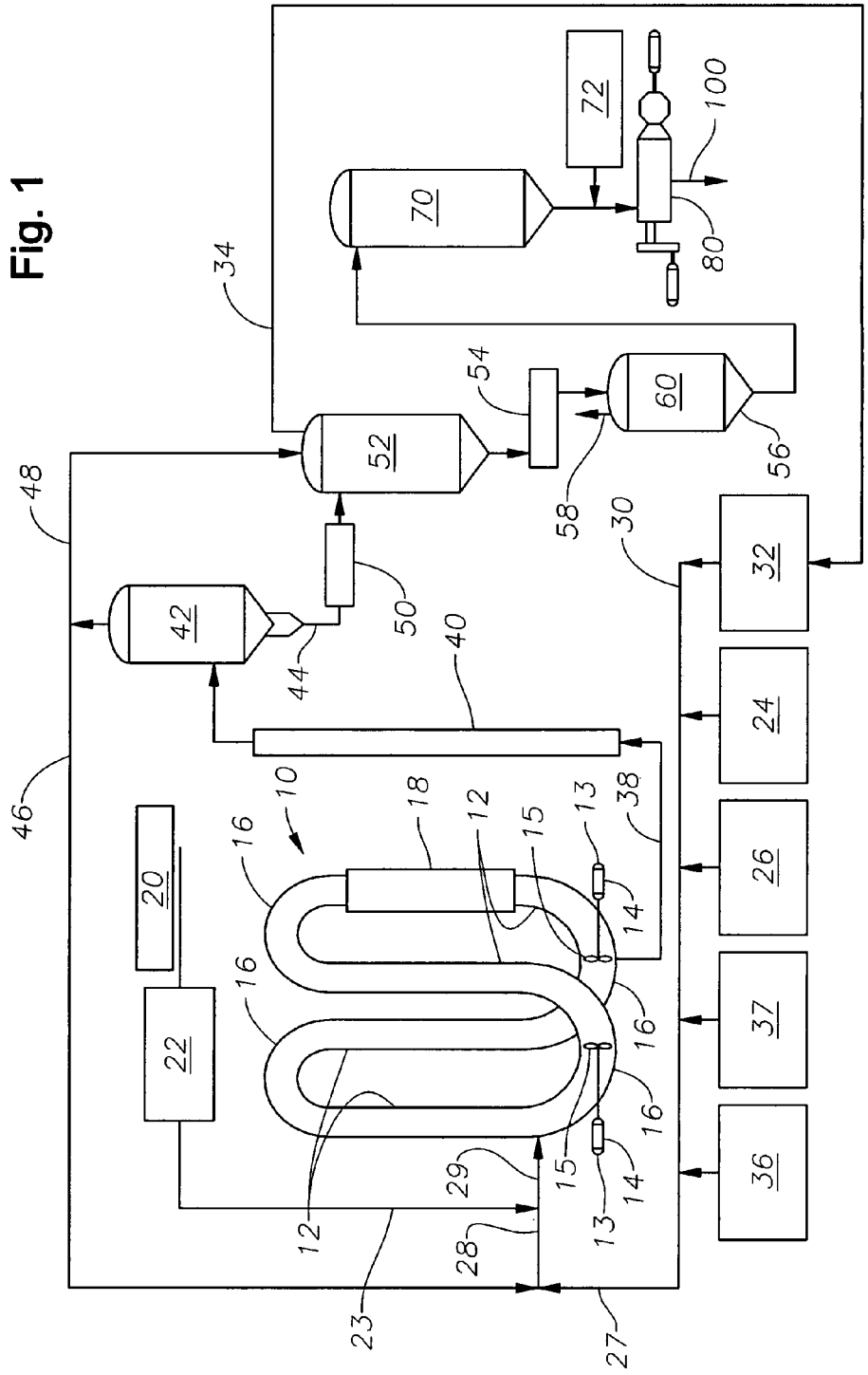
FIG. 1 is a schematic perspective view of a 4-leg slurry loop reactor system with a single stage flash in which fouling can be controlled via the methods of the present invention.

One aspect of the present invention relates to a method for operating a slurry-type polymerization reactor to reduce, inhibit, and/or prevent fouling in one or more portions of a reaction zone of the polymerization reactor. The method can advantageously comprise the steps of: (a) polymerizing a monomer feed (e.g., preferably an olefinic feed comprising ethylene, more preferably comprising a majority of ethylene and optionally a comonomer) in the reaction zone of the slurry-type polymerization reactor in the presence of a slurry diluent and a slurry catalyst comprising a catalyst metal to form an ethylene-based polymer; (b) measuring a process operating parameter relating to the reaction zone of the polymerization reactor; and (c) when the process operating parameter rises above or drops below a fouling parameter limit, introducing a gaseous poison for the slurry catalyst into the reaction zone of the polymerization reactor to reduce, inhibit, and/or prevent fouling therein.

The monomer feed in the methods of the present invention are typically ethylene-containing monomer feeds. In a preferred embodiment, the monomer feed comprises a majority (greater than 50 wt %) of ethylene, preferably at least 70 wt % ethylene, for example at least 75 wt % ethylene, at least 80 wt % ethylene, at least 85 wt % ethylene, at least 90 wt % ethylene, or at least 95 wt % ethylene. In another preferred embodiment, the monomer feed is substantially olefinic in nature. As used herein with reference to a composition, the term "substantially" should be understood to mean at least 98%, preferably at least 99%, for example at least 99.5% or at least 99.9%, by weight, of the composition; in some embodiments, "substantially" can mean completely, or about 100% by weight. In one embodiment, the monomer feed comprises not more than 99.9 wt % ethylene, for example not more than 99.7 wt % ethylene, not more than 99.5 wt % ethylene, not more than 99.3 wt % ethylene, or not more than 99 wt % ethylene.

Optionally, the monomer feed additionally comprises a comonomer. Optional comonomers can include, but are not limited to, propylene, 1-butene, 1-pentene, 4-methyl-1-pentene, 1-hexene, 1-octene, 1-decene, and the like, and combinations thereof. In one embodiment, the optional comonomer comprises an alpha olefin, preferably propylene, 1-butene, 1-hexene, 1-octene, and/or 1-decene.

Slurry diluents useful in the slurry-type polymerization reactor and the methods according to the invention are typically inert to (or at least relatively unreactive in) the polymerization reaction and are typically liquids under the reaction conditions present in the slurry-type polymerization reactor. Examples of such slurry diluents can include, but are not limited to, hydrocarbons such as propane, butane, isobutane, pentane, isopentane, neopentane, hexane, cyclohexane, and the like, and combinations thereof. Additional or alternate examples of slurry diluents useful in the slurry-type polymerization reactor and the methods according to the invention (as well as their effect on reactor operating temperature) can be found in Hogan et al., "Phillips Petroleum Company Loop Reactor Polyethylene Technology," *J. Appl. Polym. Sci.: Appl. Polym. Symp.*, 1981, v. 39, pp. 49-60. Slurry diluents are also preferably, at least in the context of the methods of the present invention, not good solvents for the (co)polymer product formed (i.e., under normal reaction conditions) in the slurry-type polymerization reactor, as solvation of the (co)polymer product in the slurry diluent can often precede or cause fouling.

The beginnings of fouling in slurry-type polymerization reactors can be indicated by an increase in the amount of polymer swell. Thus, as the volume percent polymer content in the reactor increases, a fouling condition can become imminent, e.g., because circulation in the reaction zone can be slowed and/or stopped, which can cause rapid slurry heating, due to the exothermic nature of the polymerization reaction and/or due to impaired heat transfer within the reaction zone, e.g. from the decreasing effectiveness of external cooling. Disruptions in reactor flow can often be caused by phase disruptions in the slurry. Without being bound by theory, swelling of the polymer product, e.g., in the slurry diluent, is believed to precede actual solvation of the polymer product. Phase changes in the slurry such as polymer swelling can easily result in local slurry viscosity increases, which can ultimately result in a local/global reactor blockage (plug). Indeed, dissolved polymer may actually be a more serious fouling danger than polymer that is merely swollen. Without being bound by theory, it is believed that polymer that is dissolved will eventually drop back out of solution. When it does so, it can result in a plug more quickly than polymer that is merely swollen, e.g., because of the increased propensity of polymer de-solvation and coating on reaction zone surfaces that are cooler than the dissolved polymer, which could then also exacerbate heat transfer impairments within the system, then leading to more catastrophic fouling conditions such as plugging. Further, in addition to or instead of plug formation, fouling and fouling conditions can occur when polymer deposits on reaction zone surfaces, such as reactor walls, valves, circulation pump surfaces (e.g., impeller blades), and the like, and combinations thereof.

The catalysts useful in the methods according to the invention are typically those which are useful generally in slurry-type polymerization reactors, e.g., single site and/or multi-site catalysts relatively insoluble in the slurry diluent, such as metal oxide-based catalysts, Ziegler/Natta-type catalysts, and the like, and combinations thereof. One example of a catalyst useful in the methods according to the invention is disclosed in U.S. Pat. No. 2,285,721, the disclosure of which is incorporated herein by reference. These catalysts typically comprise a catalyst metal. Examples of such catalyst metals can include, but are not limited to, those listed in Groups 4-6 and 8-10 of the Periodic Table of Elements such as titanium, zirconium, hafnium, vanadium, chromium, and the like, and combinations thereof. In one embodiment, the catalyst metal comprises chromium. In another embodiment, the catalyst is activated such that the activated catalyst comprises a chromium oxide-based catalyst.

There are many process operating parameters that can be measured in relation to the reaction zone of a slurry-type polymerization reactor and in the methods according to the invention. Although it is highly preferred that the process operating parameters be measured in situ in the reaction zone of the slurry-type polymerization reactor (e.g., for the purpose of controlling the process operating parameters, preferably in real time, in order to reduce, inhibit, and/or prevent fouling therein), it is contemplated that process operating parameter measurements can be made ex situ and the data used to control the polymerization reaction, e.g., through control of the measured process operating parameters and/or other process operating parameters, though obviously not in real time. Further, it is contemplated that measurements of process operating parameters, though they may be made outside the reaction zone, can be, and preferably are, indicative of one or more conditions inside the reaction zone of the polymerization reactor.

In one embodiment, the measurement of one or more of the process operating parameters, the comparison of each of said process operating parameters to each fouling parameter limit, and the corresponding actions taken in response thereto, do not include use of a computer model/projection for setting either the normal process operating parameters/ranges or the fouling parameter limits.

Examples of direct and indirect process operating parameters that can be measured in and/or relating to the reaction zone of the polymerization reactor include, but are not limited to, reaction pressure, pressure $\Delta P$ across pump/impellers, temperature, slurry viscosity, slurry density, reaction zone volume percent polymer content, reaction zone solids content, slurry particle size and/or distribution, slurry circulation rate, slurry velocity, circulation pump duty (e.g., through power draw, amps, volts, or the like, or a combination thereof), conductivity/capacitance (e.g., of the reactor wall, of the slurry, or the like), monomer feed rate (including comonomer feed, if present), or the like, or combinations thereof. In one embodiment, pressure is not one of the process operating parameters that is measured. In another embodiment, certain process operating parameters have regularly varying ranges of values, such that a deviation can occur in the form of "banding," which can occur when the range of values expands significantly wider than the normal range. For instance, reaction temperature can oscillate, in some cases, over a range of about 0.2° F., whereas reaction temperature banding can result in oscillations over a range as high as about 0.6° F. or higher, for example about 1° F. or higher. Examples of process operating parameters that can exhibit banding include, but are not limited to, reaction temperature, circulation pump power draw, reaction pressure, continuous product discharge valve position (if applicable), and the like, and combinations thereof.

In the methods according to the present invention, it is contemplated that the measured process operating parameter(s) need not be what is controlled in order to control fouling. Indeed, in one embodiment, the measured process operating parameter comprises temperature, slurry circulation rate, and/or circulation pump duty, whereas, when the measured temperature and/or circulation pump duty rise(s) above the fouling limit and/or when the measured slurry circulation rate and/or circulation pump duty drops below the fouling limit, it is contemplated that at least one of the temperature, the circulation pump duty, and the slurry circulation rate may be controlled indirectly. Indeed, in the aforementioned situation, it is preferred that a gaseous catalyst poison for the slurry catalyst be introduced to control (e.g., reduce or substantially halt) the polymerization reaction.

Therefore, the fouling parameter limit mentioned herein, and, indeed, also whether the measured process operating parameter rises above or drops below said fouling parameter limit, can strongly depend on a number of factors. These factors can include, but are not limited to, one or more measurable reaction zone conditions/parameters in the slurry-type polymerization reactor and/or the nature of the one or more measurable reaction zone conditions/parameters, inter alia. In some instances, in a slurry-type polymerization of ethylene and 1-hexene in isobutane with a chromium oxide-based catalyst, certain process operating parameters, such as temperature, slurry viscosity, and reaction zone solids content, typically have a maximum value, above which fouling can generally occur (or at least is more likely to occur). Thus, when measured, these process operating parameters will generally have values that result in a fouling condition when they rise above a certain value. In other instances, again in a slurry-type polymerization of ethylene and 1-hexene in isobutane with a chromium oxide-based catalyst, certain process operating parameters, such as slurry circulation rate, typically have a minimum value, below which fouling can generally occur (or at least is more likely to occur). Thus, when measured, these process operating parameters will generally have values that result in a fouling condition when they drop below a certain value. In still other circumstances, again in a slurry-type polymerization of ethylene and 1-hexene in isobutane with a chromium oxide-based catalyst, certain process operating parameters, such as circulation pump duty, can lead to fouling conditions (or to conditions where significant fouling is more likely to occur) when measured values rise above a certain value, drop below a certain value, or both.

In response to one or more of the measured process operating parameters rising above or dropping below a fouling parameter limit, the method according to the invention includes introducing a gaseous poison (deactivating agent) for the slurry catalyst. Although catalyst poisons can be in any state of matter, it is preferred that the poison be in a gaseous state: (1) at the conditions (e.g., temperature, pressure, diluent content, and the like) in the (relevant portion(s) of) the reaction zone of the slurry-type polymerization reactor; (2) at standard temperature and pressure ("STP," which is defined herein as about 20° C. and about 100 kPa), or (3) both (1) & (2).

In various embodiments, the response to the presence of a fouling condition can be a manual response, an automatic response, or a combination thereof. In one embodiment, when the process operating parameter that is measured is pressure, the introduction of the gaseous poison is preferably not an automatic response.

In some embodiments, the response to one or more of the measured process operating parameters rising above or dropping below a fouling parameter limit can include, but is not necessarily limited to, a minor kill response or a major kill response. The difference(s) between minor and major kill responses can include, but is(are) not necessarily limited to, the period of time over which the gaseous poison is introduced, the relative amount of the gaseous poison that is introduced, the type (effectiveness) of the gaseous poison introduced in relation to the slurry catalyst, the proportion of gaseous poison introduced in comparison to carrier gas, whether the monomer feed into the polymerization is reduced or halted in addition to introduction of a gaseous poison, and a combination thereof.

Without being bound by theory, it is believed that catalyst poisons can impermanently react with the active site(s) on the slurry catalyst and/or with portions of the slurry catalyst that substantially block (e.g., sterically) the active site(s) on the slurry catalyst from catalyzing the polymerization reaction. Such impermanent reactions can include, but are not limited to, chemical complexation (e.g., delocalized charge-based interactions, such as pi-bond interactions, d-orbital interactions, or the like, or a combination thereof), chemical association (e.g., dipolar interaction, hydrogen-bonding, or the like, or a combination thereof), physical association (e.g., van der Waals interaction), or the like, or combinations thereof.

Examples of gaseous catalysts poisons useful in the methods according to the invention can include, but are not limited to, sulfur-containing poisons (e.g., hydrogen sulfide, mercaptans, and the like), oxygen-containing poisons (e.g., carbon monoxide, carbon dioxide, oxygen, and the like), nitrogen-containing poisons (e.g., amines, ammonia, and the like), halogen-containing poisons (e.g., chlorine-containing poisons such as chlorine, fluorine-containing poisons such as Freon®, and the like), hydrocarbon poisons (e.g., acetylene), and the like, and combinations thereof. In a preferred embodiment, the gaseous catalyst poison comprises carbon monoxide and/or carbon dioxide, more preferably carbon monoxide. Additionally or alternately, other gaseous poisons useful in the methods according to the invention can include those disclosed in Hogan, "Catalysis of the Phillips Petroleum Company Polyethylene Process," Chap. 6 in *Applied Industrial Catalysis*, v. 1, 1983, pp. 149-174.

Gaseous catalyst poisons useful in the methods according to the invention can, in one embodiment, be introduced in combination with a carrier gas, which is typically inert to (or at least relatively unreactive with) the slurry catalyst. Examples of carrier gases can include, but are not limited to, nitrogen, argon, helium, methane, ethane, propane, and the like, and combinations thereof.

In another embodiment, the gaseous catalyst poisons useful in the methods according to the invention can be introduced in combination with a polymer chain terminating agent (e.g., hydrogen).

In another embodiment, the gaseous catalyst poisons useful in the methods according to the invention can be introduced in combination with a non-gaseous carrier, which is typically inert to (or at least relatively unreactive with) the slurry catalyst. For instance, the gaseous catalyst poison can be at least partially dissolved in an inert liquid such as a slurry diluent. Examples of non-gaseous carriers can include, but are not limited to, slurry diluent, diluent different from that in the slurry, porous catalytic solid particles, porous non-catalytic solid particles, and the like, and combinations thereof.

The methods according to the present invention ostensibly have a primary objective of reducing, inhibiting, and/or preventing fouling, although achievement of this primary objective need not necessarily be accomplished for the methods according to the present invention to be effective for other purposes, e.g., controlling reaction zone conditions/parameters, reliably operating a slurry-type polymerization reaction system, and/or the like. In one embodiment, the methods according to the invention can achieve a reduction in fouling of at least 25%, preferably at least 50%, for example at least 60%, at least 70%, at least 75%, at least 80%, at least 85%, at least 90%, or at least 95%, as compared to the fouling that would occur in slurry-type polymerization reactors operated without the methods of the present invention. The reduction in fouling can be measured by various benchmarks, e.g., the number of incidences of fouling per time period, the severity of fouling per incidence, or the like, or a combination thereof.

In the methods according to the present invention, the slurry-type polymerization reactor can be any type of polymerization reactor in which a slurry is the polymerization medium. Such polymerization reactors can include, but are not limited to, slurry loop polymerization reactors, stirred slurry polymerization reactors, or the like, or combinations thereof. In a preferred embodiment, the slurry-type polymerization reactor is a slurry loop polymerization reactor, such as one described in U.S. Pat. No. 6,239,235, the entire disclosure of which is incorporated herein by reference. In one embodiment where the slurry-type polymerization reactor is a slurry loop polymerization reactor, the polymerization reactor can advantageously comprise at least 2 legs, for example from 2 legs to 16 legs, at least 4 legs, from 4 legs to 16 legs, from 4 legs to 12 legs, from 6 legs to 12 legs, from 6 legs to 10 legs, from 8 legs to 12 legs, or from 4 legs to 8 legs. In an alternate embodiment, the polymerization reactor comprises 8 legs.

One or more of these process operating parameters can be measured at one site along the reaction zone or in a plurality of (i.e., two or more) sites along the reaction zone. In cases where the process operating parameters are measured at a plurality of sites, the conditions proximate to each of the plurality of sites can be controlled either globally within the reaction zone at a single site or locally within one or more portions of the reaction zone corresponding to locations at and/or near (upstream, downstream, or both) each of the plurality of sites. Even where the one or more process operating parameters are measured globally, i.e., at only one site along the reaction zone, the conditions within the reaction zone can be controlled at and/or near a plurality of sites, defining a plurality of portions, of the reaction zone.

In one embodiment where the polymerization reactor is a slurry loop polymerization reactor comprising a plurality of legs, the plurality of sites along the reaction zone can correspond to the plurality of legs. For example, where there are 8 legs, there may be 8 process operating parameter measurement points, 8 introduction points for the gaseous poison, or both.

Referring now to the drawings, there is shown in FIG. 1 a slurry loop polymerization reactor 10 having vertical segments or legs 12, as well as upper and lower horizontal segments (not labeled). The reactor can be cooled, e.g., by means of pipe heat exchangers. Each segment can be connected to the next segment by a smooth bend or elbow, thus providing a continuous flow path, typically substantially free from internal obstructions. The polymerization mixture can be circulated by means of impellers 15 driven by circulating pump motor(s) 14 that have power 13 supplied thereto. One or more process operating parameters can be measured in the reaction zone of reactor 10, e.g., at measurement points (exemplified by 18), or can be measured at one or more points external to the reaction zone but reflecting conditions occurring in the reaction zone (e.g., circulating pump power draw, which can be measured at power supply 13). If necessary, and as described herein, a "kill" agent, or an agent that reduces or substantially halts the catalytic polymerization of monomer feed, can be added at one or more points 16 along the reaction zone of reactor 10 in response to changing reactor conditions. Monomer, (optional) comonomer, chain terminating agent (if necessary), optional antistatic agent, activated catalyst, and diluent can be introduced via lines 24, 26, 36, 37, 23, and 30, respectively, which can enter the reactor individually or together via lines 27, 28, 29, at one or a plurality of locations along the reaction zone. In order to form the activated catalyst, raw catalyst 20 can be treated in a catalyst activator 22 under conditions sufficient to activate the catalyst to an activity sufficient for polymerizing the monomer (and optional comonomer) feed(s).

In the embodiment in FIG. 1, an intermediate product slurry can be withdrawn via conduit 38 into a high pressure flash chamber 42. Conduit 38 can optionally include a surrounding conduit 40, which can be provided with a heated fluid to indirectly heat the intermediate product slurry material in flash line conduit 38. Vaporized diluent can exit the flash chamber 42 for further processing, which can include recycle (preferably without the necessity for compression) via conduit 46 to the reaction zone of reactor 10 and/or optional use in a subsequent product purification step (e.g., in low pressure flash chamber 52 via conduit 48). Polymer particles can be withdrawn from high pressure flash chamber 42 for further processing using techniques known in the art. For instance, the high pressure flash chamber polymer product can be passed to low pressure flash chamber 52 via conduit 44, which, like conduit 38, can optionally include a surrounding conduit 50, which can be provided with a heated fluid to indirectly heat the high pressure flash polymer product passing therethrough. Again, as with high pressure flash chamber 42, vaporized diluent can exit low pressure flash chamber 52 for further processing, which can include recycle (preferably without the necessity for compression) via conduit 34 to optional diluent purification system 32 and ultimately to the reaction zone of reactor 10 via lines 27, 28, 29. In some embodiments, at least about 70 wt %, and in some cases up to about 90 wt %, of the slurry diluent can generally be recovered/recycled by using this two stage flash system.

If necessary, the low pressure flash polymer product can be further subject to post-flash drying, e.g., by exposure to heat such as in dryer 54 and/or by exposure to purge gas 56 (e.g., relatively inert, such as nitrogen) in purge vessel/column 60 (with purge vent 58 as the purge outlet), before being processed into polymer product for sale and/or being further processed into a polymer-containing article 100. Polymer product can, in one embodiment, be placed into feed bin 70, optionally combined with liquid and/or dry additives 72, and processed into pellets and/or an article, e.g., via extruder 80.

Figure 2:
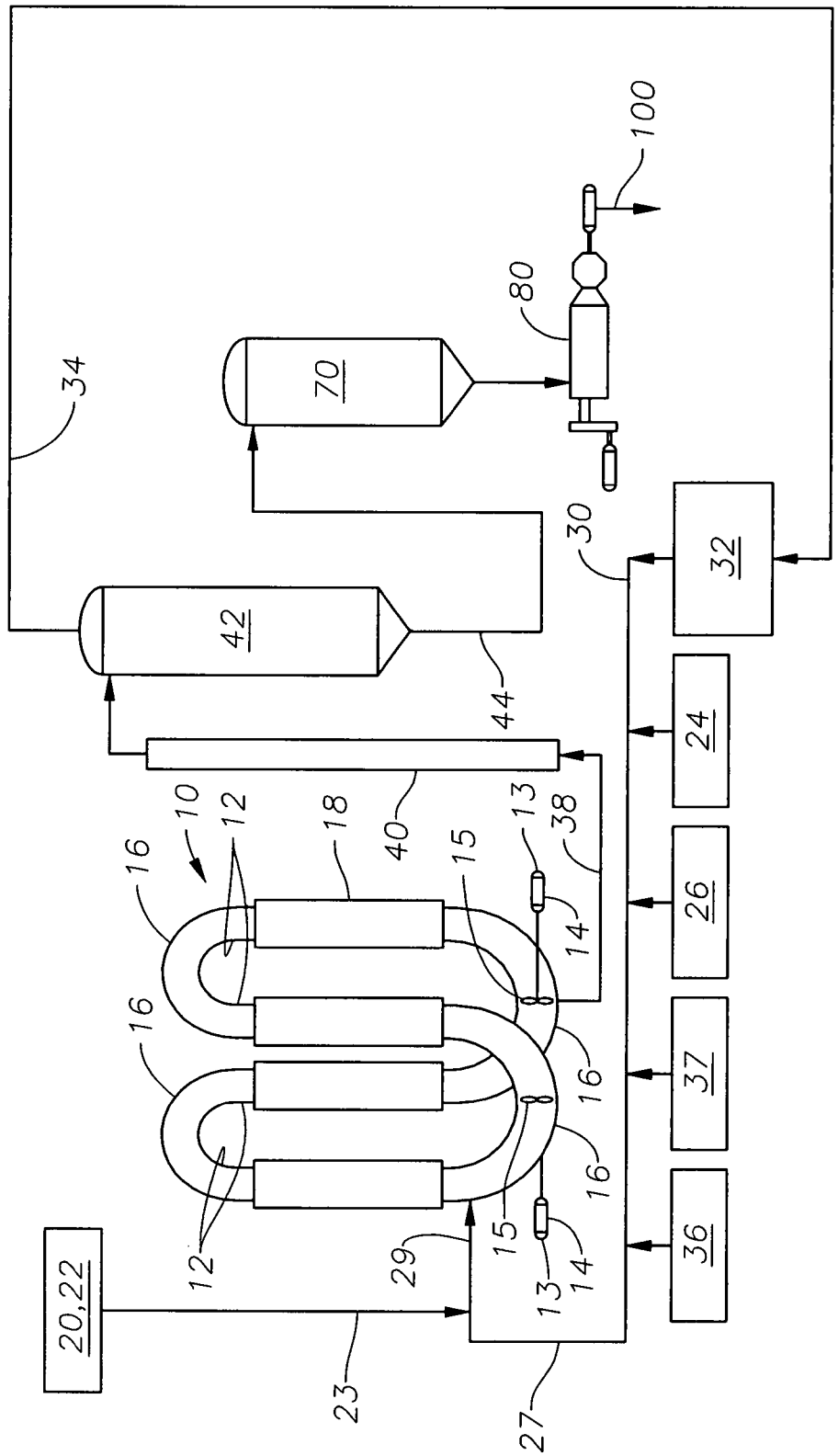
FIG. 2 is a schematic perspective view of a 4-leg slurry loop reactor system with a two stage flash in which fouling can be controlled via the methods of the present invention.

Referring now to FIG. 2, an alternative slurry loop reactor 10 is shown. This reactor has similar components to the reactor described in FIG. 1, except the devolatilization of the polymer product can be achieved without the necessity of a two stage flash. In FIG. 2, an intermediate product slurry can be withdrawn from reactor 10 via conduit 38, optionally include a surrounding conduit 40, into single flash chamber 42, which is different than in FIG. 1. As a result of the lower pressure, a single stage flash may be accomplished to achieve similar levels in flash chamber polymer product purity. Again, vaporized diluent can exit flash chamber 42 for further processing, which can include recycle via conduit 34 to optional diluent purification system 32 and ultimately to the reaction zone of reactor 10 via lines 27, 29. Also, although not shown, optional post-flash drying can be accomplished similarly to that shown in FIG. 1 before pelletizing polymer product and/or fabricating polymer-containing articles 100 via bin 70 and extruder 80, with optional additives 72 (not shown in FIG. 2), just like in FIG. 1.

Commercial production of ethylene-based (i.e., predominantly ethylene by weight) polymers in diluent (e.g., isobutane) had previously been limited to a maximum solids concentration in the reactor of 35-40 wt %. Indeed, concentrations of greater than 40 wt %, for example greater than 45 wt %, greater than 50 wt %, greater than 52 wt %, or even as high as 55 wt % or more, are believed to be possible with the reactors and methods described herein.

Other aspects of slurry loop polymerization reactors useful in the methods of the present invention can be found, e.g., in Hogan, "Catalysis of the Phillips Petroleum Company Polyethylene Process," Chap. 6 in *Applied Industrial Catalysis, Vol.* 1, 1983, pp. 149-174, and in U.S. Pat. Nos. 6,239,235, 6,204,344, 6,281,300, 6,800,698, 6,833,415, 6,926,868, and 7,034,900, the disclosures of each of which are incorporated herein by reference in their entirety.

In one embodiment, the method of the present invention further comprises the step of reducing or substantially halting the monomer feed and optionally other feeds such as the chain terminating agent (e.g., hydrogen) feed and/or the catalyst feed. In one embodiment, although this further step can be undertaken in response to a fouling condition, it may additionally or alternately be undertaken in response to something less than a fouling condition. For instance, where the slurry-type polymerization reactor has a process operating parameter range, the maximum value of which is lower and/or higher (depending on the type of process operating parameter, e.g., as described above) than the fouling condition for that process operating parameter, and where the measured process operating parameter rises above and/or drops below (as the case may be) the process operating parameter range, the monomer feed and optionally other feeds can be reduced and/or halted in response thereto.

In an embodiment where the method of the present invention further comprises the step of reducing a feed, the given feed rate is preferably drastically reduced, e.g., reduced by at least 50%, by at least 60%, by at least 65%, by at least 70%, by at least 75%, by at least 80%, by at least 85%, by at least 90%, by at least 95%, by at least 98%, by at least 99%, or by about 100% (i.e., completely reduced, or halted). Where the monomer feed comprises ethylene and one or more comonomers, the monomer feed rate is measured as the sum of all the feed rates of all the respective (co)monomers, and thus the reduction in monomer feed rate, as used herein, is based on the sum of all the feed rates.

Another aspect of the invention relates to a method for responding to changing conditions in a reaction zone of a slurry-type polymerization reactor. The method can advantageously comprise the steps of: (a) using a reactor circulating pump having a desired power draw range, circulating a monomer feed (e.g., preferably an olefinic feed comprising ethylene, more preferably comprising a majority of ethylene and optionally a comonomer) in a reaction zone of the slurry-type polymerization reactor in the presence of a slurry diluent and a slurry catalyst comprising a catalyst metal; (b) polymerizing the monomer feed to form a polymer (preferably an ethylene-based polymer), wherein the polymerization reactor has one or more process operating parameter ranges (e.g., a reaction temperature range) and a fouling parameter limit (e.g., a fouling temperature) for each process operating parameter that is greater than or less than (e.g., for temperature, greater than) each process operating temperature range; (c) measuring the one or more process operating parameters (e.g., temperature) for comparison to each of the one or more process operating parameter ranges and each fouling condition; and (d) responding to changing conditions in the polymerization reactor. The responses to the changing conditions can include, but are not limited to, one or more of the following: (i) when the measured temperature in the reaction zone exceeds the reaction temperature range but does not exceed the fouling temperature, reducing or substantially halting the monomer feed into the at least one of the portions of the reaction zone, optionally proximate to the measured temperature, (ii) when the measured temperature in the reaction zone exceeds the fouling temperature, introducing a gaseous poison for the slurry catalyst into the reaction zone, optionally proximate to the measured temperature, to reduce, inhibit, and/or prevent fouling in at least one of the portions of the reaction zone of the polymerization reactor, and (iii) when the reactor circulator pump exceeds the desired power draw range, introducing a gaseous poison for the slurry catalyst into the reaction zone, optionally proximate to the measured temperature, to reduce, inhibit, and/or prevent fouling therein, and optionally but preferably reducing or substantially halting the monomer feed into the polymerization reactor.

In any of the methods according to the invention addressing process upsets and the relative likelihood of fouling, one advantage can be to address and to improve (e.g., to minimize) the amount of time it takes to get the polymerization reactor system back to production scale and speed (system downtime) after any process upset (whether it actually resulted in fouling or not). In this regard, one of the advantages of using a gaseous catalyst poison is that any residual poison can be flushed from the system more easily than less volatile catalyst poisons (e.g., liquids such as water). In addition, because in some embodiments no catalyst poison is introduced (e.g., merely the monomer feed and optionally other feeds can be reduced or substantially halted), the system can be restarted such that polymer product can be formed at the appropriate scale and speed with less difficulty and/or in less time than using conventional parameters/methods to address process upsets (fouling). Minimizing reactor downtime can have a large and positive effect on production costs through increasing (e.g., maximizing) production efficiency.

Also in any of the methods according to the invention, after a gaseous catalyst poison is added to the polymerization reactor system, e.g., to substantially halt the polymerization reaction, the amount of system downtime can advantageously be not more than 36 hours, preferably not more than 24 hours, for example from 1.5 hours to 24 hours, from 1.5 hours to 18 hours, from 1.5 hours to 12 hours, from 1.5 hours to 8 hours, from 1.5 hours to 6 hours, from 3 hours to 18 hours, from 4.5 hours to 18 hours, from 6 hours to 18 hours, from 3 hours to 8 hours, or from 12 hours to 24 hours. Exemplary steps taken during system downtime can include, but are not limited to, flushing the reaction zone contents (e.g., with a liquid diluent, with a gaseous diluent, by depressurization, or the like, or a combination thereof), physically and/or chemically removing any fouling in the reaction zone (e.g., removing plugs, deposited fines, and/or deposited coatings on reactor surfaces), removing any residual undesirable compounds (e.g., all catalyst poisons such as water, oxygen, and the like) from the de-fouled reaction zone, pressurizing the reaction zone, initiating monomer and other feeds into the reaction zone, optionally sampling polymer produced in the reaction zone, and the like, and combinations thereof.

Additionally or alternately, the present invention can relate to the following list of embodiments:

EMBODIMENT 1

A method for operating a slurry-type polymerization reactor comprising the steps of:

polymerizing a monomer feed, which comprises a majority of ethylene and optionally a comonomer, in a reaction zone of the slurry-type polymerization reactor in the presence of a slurry diluent and a slurry catalyst to form an ethylene-based polymer;

measuring a process operating parameter relating to the reaction zone of the polymerization reactor; and when the process operating parameter rises above or drops below a fouling parameter limit, introducing a gaseous poison for the slurry catalyst into the reaction zone of the polymerization reactor to reduce, inhibit, and/or prevent fouling in the reaction zone of the polymerization reactor.

EMBODIMENT 2

A method for responding to changing conditions in a slurry-type polymerization reactor comprising the steps of:

using a reactor circulating pump having a desired power draw range, circulating a monomer feed, which comprises a majority of ethylene and optionally a comonomer, in a reaction zone of the slurry-type polymerization reactor in the presence of a slurry diluent and a slurry catalyst;

polymerizing the monomer feed to form an ethylene-based polymer, wherein the reaction zone of the polymerization reactor has a reaction temperature range and a fouling temperature that is greater than the reaction temperature range;

measuring a temperature relating to the reaction zone for comparison to the reaction temperature range and the fouling temperature; and responding to changing conditions in the polymerization reactor as follows:

when the measured temperature in the reaction zone exceeds the reaction temperature range but does not exceed the fouling temperature, reducing or substantially halting the monomer feed into the reaction zone, when the measured temperature in the reaction zone exceeds the fouling temperature, introducing a gaseous poison for the slurry catalyst into the reaction zone, optionally proximate to the at least one measured temperature, to reduce, inhibit, and/or prevent fouling in the reaction zone of the polymerization reactor, and when the reactor circulator pump exceeds the desired power draw range, introducing a gaseous poison for the slurry catalyst into the reaction zone, optionally proximate to the measured temperature, to reduce, inhibit, and/or prevent fouling therein, and optionally but preferably reducing or substantially halting the monomer feed into the polymerization reactor.

EMBODIMENT 3

The method of any of the previous embodiments, wherein the process operating parameter comprises temperature, which rises above the fouling parameter limit at a fouling temperature.

EMBODIMENT 4

The method of any of the previous embodiments, wherein the slurry catalyst comprises a metal selected from Groups 4-6 and 8-10 of the Periodic Table of Elements.

EMBODIMENT 5

The method of any of the previous embodiments, wherein the slurry catalyst comprises chromium.

EMBODIMENT 6

The method of any of the previous embodiments, wherein the slurry diluent is selected from the group consisting of propane, butane, isobutane, pentane, isopentane, neopentane, hexane, cyclohexane, and a combination thereof.

EMBODIMENT 7

The method of any of the previous embodiments, wherein the slurry diluent comprises isobutane.

EMBODIMENT 8

The method of any of embodiments 2-7, wherein the fouling temperature is from 100° F. to 250° F.

EMBODIMENT 9

The method of any of embodiments 2-8, wherein the reaction temperature range is from 120° F. to 280° F.

EMBODIMENT 10

The method of any of the previous embodiments, wherein the gaseous poison comprises carbon monoxide, carbon dioxide, or a mixture thereof.

EMBODIMENT 11

The method of any of the previous embodiments, further comprising reducing or substantially halting the monomer feed into the polymerization reactor.

EMBODIMENT 12

The method of any of the previous embodiments, wherein the introduction of the gaseous poison is sufficient to substantially halt the polymerizing step in the reaction zone of the polymerization reactor.

EMBODIMENT 13

The method of any of the previous embodiments, wherein the slurry-type reactor is a slurry loop reactor or a stirred slurry reactor.

EMBODIMENT 14

The method of any of the previous embodiments, wherein the introduction of the gaseous poison reduces fouling in the reaction zone of the polymerization reactor by at least 50%.

EXAMPLES

Aspects of the present invention can be further described in the following examples, which are intended merely to illustrate the invention and not to limit its scope, as defined by the appended claims.

Example 1

Kill Logic for Reactor Temperature, Pump Power Draw in Fouling Condition

Table 1 below shows the steps to be taken when temperature and/or circulating pump power draw exceed/fall outside of acceptable parameter limit ranges. In this example, the "kill feed" is 10% carbon monoxide in nitrogen.

TABLE 1

|  | Pull Feeds: eth, hex, cat, $H_2$ | KILL FEED | |
|---|---|---|---|
|  |  | MINI KILL Pump running: 8 kill feed points 3 sec. feed | MAJOR KILL Pump down: 8 kill feed points 20 sec. feed |
| Rx Circ Pump Elec./ Mech. Fail. |  |  |  |
| run status | Y | N | Y |
| low* kW's | Y | N | Y |
| Process Upset |  |  |  |
| high* circ. pump kW's | Y | N | Y |
| high* TRC Rx temp | Y | N | N |
| fouling** TRC Rx temp | Y | Y | N |

*"high" temperature is above maximum of normal temperature range; "high" kW's is above maximum of normal pump power draw range; and "low" kW's is below minimum of normal pump power draw.
**"fouling" temperature is above "high" temperature.

As described in Table 1 above and as used herein, the terms "high" and "low", with respect to each process operating parameter, can be determined based on experience and on risk tolerance and can be linked to a value that reflects a condition under which the relative possibility of fouling is low-to-medium (e.g., the dividing line between unlikely and likely). Further, the term "fouling", with respect to each process operating parameter, can be determined based on experience and on risk tolerance and can be linked to a value that reflects a condition under which the relative possibility of fouling is medium-to-high (e.g., the dividing line between likely and probable). Thus, with respect to temperature, for example, below the "high" temperature, the likelihood of fouling is believed to be relatively low; above the "fouling" temperature, the likelihood of fouling is believed to be relatively high; and thus, between the "high" temperature and the "fouling" temperature, the likelihood of fouling is believed to be relatively medium. Further, with respect to circulating pump power draw, for example, above the "low" power draw, the likelihood of fouling is believed to be relatively low; below the "low" power draw, the likelihood of fouling is believed to be at least relatively medium.

Example 2

Single Stage Flash Reactor According to the Invention

Example 2 is indicative of the reactor shown in FIG. 2. The discharge of the intermediate slurry product in such reactors can occur, e.g., through settling legs or with continuous product discharge. Settling legs can be equipped with ball valves that can open or close by means of a sequence controller that can be actuated by a reactor parameter (e.g., pressure) controller. Each reactor settling leg can have an individual line to a flash chamber, allowing disassembly and cleaning of a settling leg with minor or no interruption in process operation. Continuous product discharge can advantageously include a single control valve that can open and close based on a reactor parameter (e.g., pressure) controller.

Separation of polyethylene particles from the diluent (e.g., isobutane) and the unincorporated feedstocks (e.g., ethylene, hydrogen, and optionally comonomer such as 1-hexene) can occur in a low-pressure flash chamber. As the effluent is reduced in pressure, e.g., from about 550 psig to about 6-12 psig, substantially all of the free liquid/diluent can be vaporized. Vaporized components from the low-pressure flash chamber can exit overhead, e.g., through a cyclone and then a bag filter, where the entrained solid product can be recovered and fed back to the polymer dryer, e.g., via rotary valves. Overhead gas from the bag filter can then be sent to a guard filter prior to the flash gas compressors for compression, condensation, separation (e.g., via fractionation columns), treatment, and recycle back to the reactor. The polymer powder can flow out of the bottom of the low-pressure flash chamber through a rotary valve to the devolatilization section. The utilization of a variable speed rotary valve in conjunction with level indication can allow a polymer level to be maintained in the low pressure flash chamber. This level can advantageously serve as a vapor seal to prevent excessive vaporized hydrocarbons from overwhelming downstream recovery equipment.

The recovery and recycle of feedstocks and diluent in a single stage flash system can result in significant capital investment and higher operating cost than multiple stage flash systems for slurry loop reactor processes.

Example 3

Two Stage Flash Reactor According to the Invention

Example 3 is indicative of the reactor shown in FIG. 1. In this example, the intermediate polymer slurry product (e.g., containing polymer powder, diluent such as isobutane, unreacted ethylene, optionally unreacted comonomer such as 1-hexene, and optionally un-consumed chain terminating agent such as hydrogen) can, in one embodiment, leave the reactor through a continuous product discharge valve into a first stage flash chamber, which can operate, e.g., at about 150 psig to about 205 psig, depending upon polymer product grade. A flash line heater can be employed between the reactor and the first stage flash chamber to provide additional heat to the intermediate polymer slurry product, which can increase the isobutane content of the overhead gas from the first stage flash chamber. Operation of the first stage flash chamber can be important to advantageously create a more economical operation in bypassing downstream compressors, distillation, and treating facilities. If necessary to optimize performance, the flash line heater can be divided into two or more sections, at least one downstream of the continuous product discharge valve and at least one downstream of the first stage flash chamber bottom outlet (seal chamber). The latter section can advantageously allow more heat input into the polymer after the first stage flash chamber, with a goal of improving polymer drying and reducing the content of VOCs in the polymer product.

In some embodiments, the overhead of the first stage flash chamber, which can comprise diluent such as isobutane, unreacted ethylene, optionally unreacted comonomer such as 1-hexene, and optionally un-consumed chain terminating agent such as hydrogen, can pass through a cyclone where entrained product can be separated and sent to the second stage flash chamber. The exit gas stream from the cyclone can flow through a condenser, e.g., equipped with temperature-controlled cooling water, to be condensed and collected in an accumulation vessel for direct return to the reactor. Small amounts of non-condensibles, e.g., as controlled by pressure, can be purged out of the top of the accumulation vessel.

The use of flash line heaters can allow polymer powder and a small amount of entrained diluent such as isobutane, unreacted ethylene, optionally unreacted comonomer such as 1-hexene, and optionally un-consumed chain terminating agent such as hydrogen to pass initially out the bottom of the first stage flash chamber, and further through a level controlled seal chamber and a second flash line heater to the second stage flash chamber, which can operate, e.g., at about 6-12 psig. In a reactor design that does not contain flash line heaters, the concentrated slurry comprising polymer powder, entrained diluent such as isobutane, unreacted ethylene, optionally unreacted comonomer such as 1-hexene, and optionally un-consumed chain terminating agent such as hydrogen can flow from the seal chamber to the second stage flash chamber, where the remaining volatile components can be vaporized.

Gas from the second stage flash chamber can exit overhead, e.g., through a cyclone and then a bag filter, where the entrained solid product can be recovered and fed back to the polymer dryer, e.g., via rotary valves. Overhead gas from the bag filter can then be sent to a guard filter prior to the flash gas compressors for compression, condensation, separation (e.g., via fractionation columns), treatment, and recycle back to the reactor. The polymer powder can flow out of the bottom of the low-pressure flash chamber through a rotary valve to the devolatilization section. The utilization of a variable speed rotary valve in conjunction with level indication can allow a polymer level to be maintained in the low pressure flash chamber. This level can advantageously serve as a vapor seal to prevent excessive vaporized hydrocarbons from overwhelming downstream recovery equipment.

Example 4

Major/Minor Kill Triggers for Slurry Loop Reactors According to the Invention

Table 2 below shows the relationship between "high" and "critical" temperature values, as a function of polymer product density. Polymer density (g/cm$^3$) is determined using a compression molded sample, cooled at 15° C. per hour and conditioned for 40 hours at room temperature according to ASTM D1505-68 and ASTM D1928, procedure C.

TABLE 2

| "High" temp. (° F.) | "Fouling" temp. (° F.) | Product density (g/cm$^3$) |
| --- | --- | --- |
| 227 | 228 | 0.962 |
| 217.5 | 218 | 0.952 |
| 215.5 | 216 | 0.948 |
| 212 | 212.5 | 0.943 |
| 210 | 212 | 0.941 |

Table 3 below shows the relationship between "critical" reaction temperature and comonomer (1-hexene) feed ratio over a variety of samples, each sample having a melt index $I_2$ (alternately termed $I_{2.16}$ and defined as in ASTM D1238-95) in the range of about 0.2 dg/min to about 10 dg/min.

TABLE 3

| Sample | "Fouling" temp. (° F.) | $C_6^-$ feed ratio† |
| --- | --- | --- |
| A | 211.5 | 4.5 |
| B | 212 | 4 |
| C | 212.5 | 4 |

TABLE 3-continued

| Sample | "Fouling" temp. (° F.) | $C_6^=$ feed ratio† |
|---|---|---|
| D | 213.5 | 3 |
| E | 216 | 2.5 |
| F | 216 | 2 |
| G | 217 | 2 |
| H | 217.5 | 2 |
| I | 217.5 | 1.9 |
| J | 217 | 1.6 |
| K | 218 | 1 |
| L | 228 | 0 |

†hexene feed ratio is measured as gallons/hr of hexene per 1000 lbs/hr of ethylene.

Table 4 below augments Table 3 by showing the relationship between comonomer (1-hexene) content and polymer product melt density over a variety of samples. Table 4 also includes melt index (MI) values for the various samples. As reflected in Table 4, $I_{22}$ (alternately termed $I_{21}$ or $I_{21.6}$) and $I_2$ (alternately termed $I_{2.16}$) are defined as in ASTM D1238-95.

TABLE 4

| Sample | Product density (g/cm³) | $C_6^=$ feed ratio† | MI (dg/min) |
|---|---|---|---|
| M | 0.945 | 4.5 | 0.35 [$I_2$] |
| N | 0.946 | 1.5 | 5.5 [$I_{22}$] |
| O | 0.948 | 3 | 0.2 [$I_2$] |
| P | 0.949 | 1.9 | 10 [$I_2$] |
| Q | 0.950 | 2.5 | 0.3 [$I_2$] |
| R | 0.950 | 2.1 | 0.3 [$I_2$] |
| S | 0.952 | 0 | 2 [$I_{22}$] |
| T | 0.953 | 0.2 | 3.5 [$I_{22}$] |
| U | 0.954 | 1 | 0.3 [$I_2$] |
| V | 0.954 | 0.8 | 0.3 [$I_2$] |
| W | 0.954 | 0.7 | 5.5 [$I_{22}$] |

†hexene feed ratio is measured as gallons/hr of hexene per 1000 lbs/hr of ethylene.

Example 5

Effect of Reactor Solids Content on "High" Temperature Values

Table 5 below shows the relationship between "high" temperature values, as a function of solids content in the reaction zone, at three different constant product densities.

TABLE 5

| Slurry solids (wt %) | "High" temp. (° F.) | Product density (g/cm³) |
|---|---|---|
| 35 | 225 | 0.962 |
| 40 | 223 | 0.962 |
| 55 | 221 | 0.962 |
| 35 | 221 | 0.953 |
| 40 | 220 | 0.953 |
| 55 | 218 | 0.953 |
| 35 | 205 | 0.942 |
| 40 | 204 | 0.942 |
| 55 | 203 | 0.942 |

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

We claim:

1. A method for operating a slurry polymerization reactor comprising the steps of:
    polymerizing a monomer feed, which comprises a majority of ethylene and optionally a comonomer, in a reaction zone of the slurry polymerization reactor in the presence of a slurry diluent and a slurry catalyst to form an ethylene-based polymer;
    measuring a process operating parameter; and
    when the process operating parameter rises above or drops below a fouling parameter limit, introducing a gaseous poison for the slurry catalyst into the reaction zone of the polymerization reactor to reduce, inhibit, and/or prevent fouling in the reaction zone of the polymerization reactor.

2. The method of claim 1, wherein the process operating parameter comprises temperature, which rises above the fouling parameter limit at a fouling temperature.

3. The method of claim 1, wherein the slurry catalyst comprises a metal selected from the group consisting of Groups 4-6 and 8-10 of the Periodic Table of Elements.

4. The method of claim 1, wherein the slurry catalyst comprises chromium.

5. The method of claim 1, wherein the slurry diluent is selected from the group consisting of propane, butane, isobutane, pentane, isopentane, neopentane, hexane, cyclohexane, and a combination thereof.

6. The method of claim 1, wherein the slurry diluent comprises isobutane.

7. The method of claim 2, wherein the fouling temperature is from 100° F. to 280° F.

8. The method of claim 1, wherein the gaseous poison comprises carbon monoxide, carbon dioxide, or a mixture thereof.

9. The method of claim 1, further comprising reducing or substantially halting the monomer feed into the polymerization reactor.

10. The method of claim 1, wherein the introduction of the gaseous poison is sufficient to substantially halt the polymerizing step in the reaction zone of the polymerization reactor.

11. The method of claim 1, wherein the slurry reactor is a slurry loop reactor or a stirred slurry reactor.

12. The method of claim 1, wherein the introduction of the gaseous poison reduces fouling in the reaction zone of the polymerization reactor by at least 50%.

13. A method for responding to changing conditions in a slurry polymerization reactor comprising the steps of:
    using a reactor circulating pump having a desired power draw range, circulating a monomer feed, which comprises a majority of ethylene and optionally a comonomer, in a reaction zone of the slurry polymerization reactor in the presence of a slurry diluent and a slurry catalyst;
    polymerizing the monomer feed to form an ethylene-based polymer, wherein the reaction zone of the polymerization reactor has a reaction temperature range and a fouling temperature that is greater than the reaction temperature range;
    measuring a temperature in the reaction zone for comparison to the reaction temperature range and the fouling temperature; and
    responding to changing conditions in the polymerization reactor as follows:
        when the measured temperature in the reaction zone exceeds the reaction temperature range but does not exceed the fouling temperature, reducing or substantially halting the monomer feed into the reaction zone, when the reactor circulator pump exceeds the desired power draw range, introducing a gaseous poison for the slurry catalyst into the reaction zone, optionally proximate to the measured temperature, to reduce, inhibit, and/or prevent fouling therein, and optionally reducing or substantially halting the monomer feed into the polymerization reactor, and when the measured temperature in the reaction zone exceeds the fouling temperature, introducing a gaseous poison for the slurry catalyst into the reaction zone, optionally proximate to the at least one measured temperature, to reduce, inhibit, and/or prevent fouling in the reaction zone of the polymerization reactor.

14. The method of claim 13, wherein the slurry catalyst comprises a metal selected from the group consisting of Groups 4-6 and 8-10 of the Periodic Table of Elements.

15. The method of claim 13, wherein the slurry catalyst comprises chromium.

16. The method of claim 13, wherein the slurry diluent is selected from the group consisting of propane, butane, isobutane, pentane, isopentane, neopentane, hexane, cyclohexane, and a combination thereof.

17. The method of claim 13, wherein the slurry diluent comprises isobutane.

18. The method of claim 13, wherein the reaction temperature range is from 100° F. to 250° F.

19. The method of claim 13, wherein the fouling temperature is from 120° F. to 280° F.

20. The method of claim 13, wherein the gaseous poison comprises carbon monoxide, carbon dioxide, or a mixture thereof.

21. The method of claim 13, wherein the introduction of the gaseous poison is sufficient to substantially halt the polymerizing step in the reaction zone of the polymerization reactor.

22. The method of claim 14, wherein the slurry reactor is a slurry loop reactor or a stirred slurry reactor.

23. The method of claim 14, wherein the introduction of the gaseous poison reduces fouling in the reaction zone of the polymerization reactor by at least 50%.

* * * * *